(12) United States Patent
Shimazaki

(10) Patent No.: US 6,918,371 B2
(45) Date of Patent: Jul. 19, 2005

(54) FUEL INJECTION CONTROL DEVICE

(75) Inventor: Naoki Shimazaki, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 10/828,646

(22) Filed: Apr. 21, 2004

(65) Prior Publication Data

US 2004/0211372 A1 Oct. 28, 2004

(30) Foreign Application Priority Data

Apr. 25, 2003 (JP) ........................................ 2003-122026

(51) Int. Cl.$^7$ ................................................ F02B 1/10
(52) U.S. Cl. ........................ 123/305; 123/435; 701/105
(58) Field of Search ................................ 123/305, 435; 701/105

(56) References Cited

U.S. PATENT DOCUMENTS

| | | | | |
|---|---|---|---|---|
| 5,718,203 A | * | 2/1998 | Shimada et al. | 123/305 |
| 5,941,213 A | * | 8/1999 | Ishii et al. | 123/435 |
| 6,236,931 B1 | * | 5/2001 | Poggio et al. | 123/435 |
| 6,334,428 B1 | * | 1/2002 | Nagatani et al. | 701/105 |
| 6,530,361 B1 | * | 3/2003 | Shiraishi et al. | 123/435 |
| 2001/0045200 A1 | * | 11/2001 | Urushihara et al. | 123/295 |
| 2002/0007817 A1 | * | 1/2002 | Ueda et al. | 123/305 |
| 2003/0056751 A1 | * | 3/2003 | Sukegawa et al. | 123/305 |

FOREIGN PATENT DOCUMENTS

| | | |
|---|---|---|
| JP | 11-082121 | 3/1999 |
| JP | 2001-020784 | 1/2001 |
| JP | 2001-323832 | 11/2001 |
| JP | 2002-327638 | 11/2002 |

* cited by examiner

*Primary Examiner*—Erick Solis
(74) *Attorney, Agent, or Firm*—McCormick, Paulding & Huber LLP

(57) ABSTRACT

A fuel injection control device in which fuel injected into the combustion chamber is ignited after a pre-mixing period has elapsed following the completion of the injection of the fuel, includes target pre-mixing period determining unit for determining the target pre-mixing period on the basis of the engine operating conditions, actual pre-mixing period detection unit for detecting the actual pre-mixing period, and pre-mixing period adjustment means for adjusting the pre-mixing period of the fuel so that the actual pre-mixing period approaches the target pre-mixing period. With this device, the pre-mixing period of the fuel can be appropriately controlled, and the exhaust gas can be reliably improved.

10 Claims, 3 Drawing Sheets

FUEL INJECTION CONTROL DEVICE

CROSS REFERENCE TO RELATED APPLICATION

Applicant hereby claims foreign priority benefits under U.S.C. § 119 of Japanese Patent Application No. 2003-122026, filed on Apr. 25, 2003, and the content of which is herein incorporated by reference.

BACKGROUND OF THE INVENTION

1. Field of the Invention

The present invention relates to a fuel injection control device with improved exhaust gas.

2. Description of the Related Art

Conventionally, in diesel engines, it has been common to perform combustion with fuel injected in the vicinity of compression top dead center, where a high temperature and high pressure are attained inside the cylinder (inside the combustion chamber).

The injected fuel is mixed with intake air to form a mixture, this mixture is ignited so that a flame is formed, and combustion is continued by supplying subsequent injected fuel to this flame. In this combustion system, ignition begins during the injection of the fuel; this will be referred to as "ordinary combustion" in the present specification.

In recent years, a new combustion system has been proposed in which NOx(Nitrogen Oxide) and smoke can be greatly decreased without causing any deterioration in fuel consumption by setting the fuel injection timing earlier than compression top dead center so that the ignition retardation period is lengthened, thus promoting sufficient mixing of the fuel and intake air (for example, see Japanese Patent Application Laid-Open No. 2001-20784 and Japanese Patent Application Laid-Open No. 2002-327638).

In concrete terms, fuel injection is performed during the period extending from the intake stroke to the compression stroke prior to compression top dead center, and ignition begins after a specified pre-mixing period has elapsed following the completion of this fuel injection. In this combustion system, the ignition retardation period is long, so that the mixture is sufficiently rarefied and uniformly mixed; accordingly, the local combustion temperature drops, so that the amount of NOx(Nitrogen Oxide) that is emitted decreases. Furthermore, since combustion in a state of insufficient air can be locally avoided, smoke is also suppressed. Combustion in which ignition thus begins following the completion of fuel injection, and the injection system used to realize this combustion, are referred to as "early pre-mixing combustion" and "early pre-mixing injection" in the present specification.

Thus, this early pre-mixing combustion (injection) is effective in improving the exhaust gas; however, control of the ignition period of the fuel is difficult, so that such combustion has been difficult to realize. In other words, in the case of the ordinary combustion described above, since the fuel is ignited during the injection of the fuel, the ignition timing can be controlled relatively easily by controlling the injection timing; however, in the case of early pre-mixing combustion, the ignition timing cannot be sufficiently controlled merely by controlling the fuel injection timing.

Furthermore, although details will be described in the section titled "Description of the Preferred Embodiments", the present inventors discovered that in the case of early pre-mixing combustion, there is a danger not only of a failure to obtain an exhaust gas cleansing effect, but also of a deterioration in HC (Hydrocarbon) emission amounts, fuel consumption, unless the period extending from the time of completion of fuel injection to the beginning of ignition (this period is referred to as the "pre-mixing period" in the present specification) is controlled to an appropriate range.

In other words, appropriate control of the ignition timing and pre-mixing period of the fuel is important for realizing early pre-mixing combustion.

SUMMARY OF THE INVENTION

It is an object of the present invention to provide a fuel injection control device which allows an improvement of exhaust gas by appropriately controlling the pre-mixing period of the fuel.

In order to achieve the abovementioned object, the present invention is a fuel injection control device in which fuel injected into the combustion chamber is ignited after a pre-mixing period has elapsed following the completion of the injection of the fuel, comprising target pre-mixing period determining means for determining the target pre-mixing period on the basis of the engine operating conditions, actual pre-mixing period detection means for detecting the actual pre-mixing period, and pre-mixing period adjustment means for adjusting the pre-mixing period of the fuel so that the actual pre-mixing period approaches the target pre-mixing period. As a result, since the pre-mixing period can be appropriately controlled, the exhaust gas can be reliably improved.

Here, the abovementioned actual pre-mixing period detection means may comprise injection completion timing detection means for detecting the timing of the completion of injection of the fuel, and ignition timing detection means for detecting the ignition timing of the fuel.

Furthermore, the abovementioned ignition timing detection means may comprise any one or a combination of a cylinder internal pressure sensor which detects the pressure inside the abovementioned combustion chamber, an ion sensor disposed inside the abovementioned combustion chamber, and an acceleration sensor which detects the acceleration of the internal combustion engine.

Furthermore, the abovementioned pre-mixing period adjustment means may control the injection timing and/or injection pressure of the fuel.

Furthermore, the abovementioned pre-mixing period adjustment means may comprise any one or a combination of exhaust gas recirculating means for recirculating the exhaust gas into the abovementioned combustion chamber, a variable compression ratio mechanism for varying the compression ratio by altering the volume of the abovementioned combustion chamber, a variable valve timing mechanism for varying the compression ratio by varying the opening-and-closing timing of the intake and exhaust valves, and injection means for injecting a liquid such as water, alcohol or the like into the abovementioned combustion chamber.

Furthermore, the fuel injection timing may be determined on the basis of the target pre-mixing period determined by the abovementioned target pre-mixing period determining means, and the target ignition timing.

Here, the abovementioned target ignition timing may be in the vicinity of compression top dead center of the piston.

Furthermore, the present invention is a fuel injection control method in which fuel injected into the combustion chamber is ignited after a pre-mixing period has elapsed following the completion of the injection of the fuel, comprising the steps of determining the target pre-mixing period on the basis of the engine operating conditions, detecting the actual pre-mixing period, and adjusting the pre-mixing period so that the actual pre-mixing period coincides with the target pre-mixing period.

Here, the abovementioned step of adjusting the pre-mixing period may include the step of adjusting the injection timing and/or injection pressure of the fuel.

Furthermore, the abovementioned step of adjusting the pre-mixing period may include one or a combination of the steps of adjusting the EGR (Exhaust Gas Recirculating) rate, adjusting the compression ratio, and adjusting the temperature of the mixture.

DESCRIPTION OF THE PREFERRED EMBODIMENTS

A preferred embodiment of the present invention will be described in detail below with reference to the attached figures.

Figure 1:
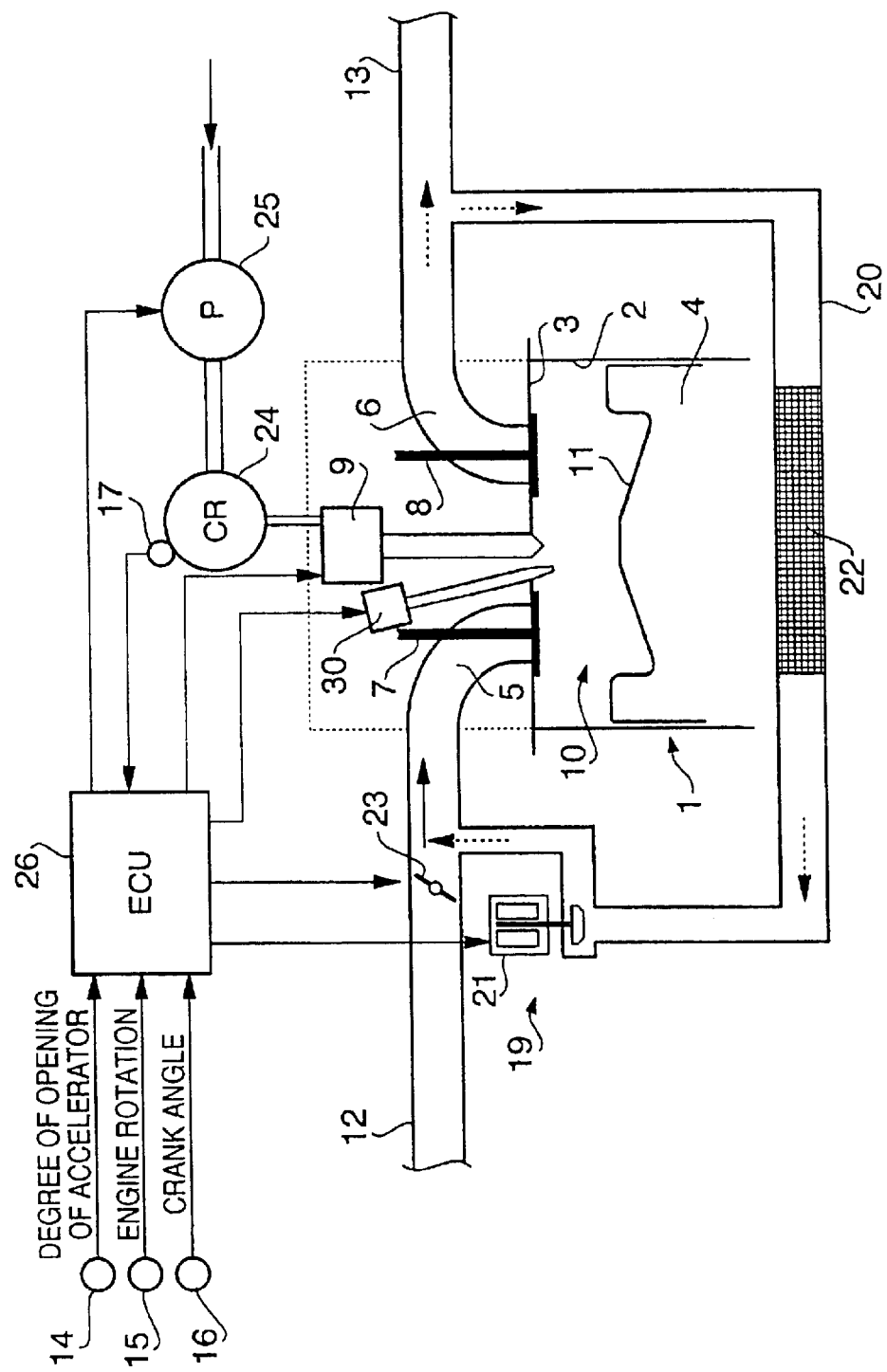
FIG. 1 is a schematic diagram of an engine comprising a fuel injection control device constituting one embodiment of the present invention.

The present embodiment is applied as a fuel injection control device for a common rail type direct injection diesel engine; the schematic construction of this fuel injection control device will be described with reference to FIG. 1. Furthermore, in this diesel engine, only a single cylinder is shown in FIG. 1; however, the engine may of course be a multi-cylinder engine.

1 in the figures indicates the engine main body; this is constructed from a cylinder 2, cylinder head 3, piston 4, intake port 5, exhaust port 6, intake valve 7, exhaust valve 8, injector (fuel injection valve) 9. A combustion chamber 10 is formed in the space between the cylinder 2 and the cylinder head 3, and fuel is directly injected into the combustion chamber 10 from the injector 9. A cavity 11 is formed in the top part of the piston 4; this cavity 11 forms a portion of the combustion chamber. In the present embodiment, the configuration of a toroidal type combustion chamber in which the center of the bottom part of the cavity 11 protrudes is adopted. In the present invention, furthermore, there are no restrictions on the shape of the combustion chamber; a re-entrant type combustion chamber or the like may also be used. The injector 9 is disposed substantially coaxially with the cylinder 2, and injects fuel simultaneously in a radial pattern from a plurality of injection holes. The injector 9 is connected to a common rail 24, and high-pressure fuel that is stored in this common rail 24 is constantly supplied to the injector 9. The pressure feeding of fuel into the common rail 24 is accomplished by a high-pressure supply pump 25.

The intake port 5 is connected to an intake pipe 12, and the exhaust port 6 is connected to an exhaust manifold 13.

The engine of the present embodiment comprises an EGR(Exhaust Gas Recirculating) device 19 (exhaust gas recirculating means) for recirculating a portion of the exhaust gas that flows through the exhaust manifold 13 into the combustion chamber 10 via the intake pipe 12. The EGR device 19 comprises an EGR pipe 20 that connects the intake pipe 12 and exhaust manifold 13, an EGR valve 21 that is used to adjust the EGR rate, and an EGR cooler 22 that cools the EGR gas on the upstream side of the EGR valve 21. An intake throttle valve 23 that is used to appropriately throttle the intake air on the upstream side of the connecting part with the EGR pipe 20 is disposed in the intake pipe 12.

An electronic control unit (hereafter referred to as an "ECU") 26 is provided for the purpose of electronically controlling this engine. The ECU 26 reads the actual engine operating conditions from the detection values of various types of sensors, and controls the injector 9, EGR valve 21, intake throttle valve 23, a regulator valve (not shown in the figures) that regulates the amount of fuel that is pressure fed (i. e., the discharge pressure) from the high-pressure supply pump 25 on the basis of these engine operating conditions. The abovementioned sensors include an accelerator opening sensor 14 that detects the degree of opening of the accelerator, an engine rotation sensor 15 that detects the rotational speed of the engine, a crank angle sensor 16 that detects the angle of the crankshaft (not shown in the figures) of the engine, a common rail pressure sensor 17 that detects the fuel pressure inside the common rail 24; the detection values of these sensors are input into the ECU 26.

The injector 9 has an electromagnetic solenoid as an electrical actuator that is switched ON or OFF by the ECU 26. When the electromagnetic solenoid is ON, the injector 9 is in an open state so that fuel is injected; when the electromagnetic solenoid is OFF, the injector 9 assumes a closed state so that fuel injection is stopped. The ECU 26 basically determines the target values of the starting timing of fuel injection (injection timing), the amount of injection (injection period), the injection pressure on the basis of parameters that indicate the engine operating conditions such as the engine rotational speed, degree of opening of the accelerator, and controls the injector 9 (electromagnetic solenoid), regulator valve in accordance with these target values. The fuel injection control device of the present embodiment is constructed from elements that are necessary for the control of the injector 9, common rail 24, high-pressure supply pump 25, regulator valve, ECU 26, for the control of the fuel injection timing, fuel injection amount and fuel injection pressure.

The fuel injection control device of the present embodiment performs early pre-mixing combustion (injection). Specifically, the ECU 26 switches the injector 9 ON so that fuel injection is performed before (earlier than) compression top dead center; this injected fuel is then ignited and burned after a pre-mixing period has elapsed following the completion of fuel injection. The fuel injection control device of the present embodiment is devised so that the pre-mixing period of the fuel (i. e., the period extending from the time at which fuel injection is completed to the time at which the fuel is ignited) is appropriately controlled, thus allowing a reliable and effective improvement of the exhaust gas. This point will be described below.

The fuel injection control device of the present embodiment comprises target pre-mixing period determining means for determining the target (optimal) pre-mixing period on the basis of the engine operating conditions, actual pre-mixing period detection means for detecting the actual pre-mixing period of the mixture, and pre-mixing period adjustment means for adjusting the pre-mixing period of fuel so that the above-mentioned actual pre-mixing period approaches (coincides with) the abovementioned target pre-mixing period. The pre-mixing period of the fuel is appropriately controlled by these respective means.

In concrete terms, the target pre-mixing period determining means comprise the ECU 26. Specifically, a map or calculation formula which determines the optimal pre-mixing period (target pre-mixing period) for each set of engine operating conditions (engine rotational speed, degree of accelerator opening) is input beforehand into the ECU 26. The term "optimal pre-mixing period" refers to a pre-mixing period which is such that NOx and smoke can be effectively reduced, and which is also such that there is no aggravation of HC (Hydro Carbon) emission or fuel consumption; this optimal pre-mixing period is determined beforehand for each set of engine operating conditions by experimentation, simulation or the like. The ECU 26 reads the engine operating conditions on the basis of the detection values of the accelerator opening sensor 14, engine rotation sensor 15, and determines the target pre-mixing period from a map or calculation formula.

The actual pre-mixing period detection means comprise injection completion timing detection means for detecting the fuel injection completion timing, and ignition timing detection means for detecting the fuel ignition timing; the ECU 26 calculates the actual pre-mixing period on the basis of the actual fuel injection completion timing and actual fuel ignition timing detected by both of these detection means.

In the present embodiment, the injection completion timing detection means comprise the ECU 26. Specifically, the ECU 26 calculates the fuel injection completion timing on the basis of the determined injection starting timing and injection amount. In concrete terms, the fuel injection timing is first calculated from the fuel injection amount and common rail pressure (fuel injection pressure), and a time that is delayed from the fuel injection starting timing by a period equal to the injection period is determined as the indicated completion timing of fuel injection (the timing at which the solenoid of the injector 9 is switched OFF). A time that is delayed from this indicated completion timing of fuel injection by a time period equal to the period that is required for the injector 9 to actually be closed after the solenoid of the injector 9 is switched OFF (i. e., the actuation delay period) is determined as the fuel injection completion timing. The actuation delay timing of the injector 9 is determined beforehand by experimentation or the like for each set of engine operating conditions (engine rotational speed, degree of accelerator opening), and is input into the ECU 26 in the form of a map or calculation formula.

In the present embodiment, the ignition timing detection means comprise the ECU 26 and a cylinder internal pressure sensor 30 which is disposed facing the interior of the combustion chamber 10, and which detects the pressure inside the combustion chamber 10. Specifically, when the fuel is ignited, the pressure inside the cylinder 10 abruptly rises; accordingly, the time at which the detection value of the cylinder internal pressure sensor 30 abruptly changes (rises) is judged to be the fuel ignition timing. The detection value of the cylinder internal pressure sensor 30 is input into the ECU 26, and the ECU 26 judges the ignition timing on the basis of this detection signal.

In the present embodiment, the pre-mixing period adjustment means comprise the ECU 26 and EGR device (exhaust gas recirculating means) 19; these means compare the actual pre-mixing period detected by the actual pre-mixing period detection means and the target pre-mixing period determined by the target pre-mixing period determining means, and adjust the pre-mixing period so that the difference between these two pre-mixing periods is eliminated, i. e., so that the actual pre-mixing period approaches the target pre-mixing period.

In the present embodiment, the adjustment of the pre-mixing period is accomplished by one or a combination of the three methods shown below.

1) Adjustment of the fuel injection starting timing: the pre-mixing period becomes longer as the fuel injection starting timing is set earlier (at a more advanced angle); conversely, the pre-mixing period becomes shorter as this timing is set later (at a more retarded angle). Accordingly, in cases where the actual pre-mixing period is shorter than the target pre-mixing period, the fuel injection starting timing is adjusted to a more advanced angle; conversely, in cases where the actual pre-mixing period is longer than the target pre-mixing period, the fuel injection starting timing is adjusted to a more retarded angle.

2) Adjustment of the fuel injection pressure (common rail pressure): the pre-mixing period becomes longer as the fuel injection pressure drops; conversely, the pre-mixing period tends to become shorter as the fuel injection pressure increases. Accordingly, in cases where the actual pre-mixing period is shorter than the target pre-mixing period, the fuel injection pressure (discharge pressure from the high-pressure supply pump 25) is adjusted downward; conversely, in cases where the actual pre-mixing period is longer than the target pre-mixing period, the fuel injection pressure is adjusted upward.

Furthermore, in the methods of 1) and 2) the adjustment of the fuel injection timing and injection pressure are adjusted with consideration being given to the fuel injection amount determined from the engine operating conditions, the output power required for the engine.

3) Adjustment of the EGR rate of the EGR device 19: the pre-mixing period is lengthened by increasing the EGR rate so that the oxygen concentration of the mixture and the compression end temperature are lowered; conversely, if the EGR rate is lowered, the pre-mixing period becomes shorter. Accordingly, in cases where the actual pre-mixing period is shorter than the target pre-mixing period, the EGR rate is adjusted upward; conversely, in cases where actual pre-mixing period is longer than the target pre-mixing period, the EGR rate is adjusted downward. In this case, the EGR device 19 acts to decrease NOx, and to adjust the pre-mixing period of the fuel.

Next, one example of the pre-mixing period control (adjustment) method will be described. Furthermore, in the present embodiment, it is desirable from the standpoints of increasing output and lowering fuel consumption that the pre-mixing period be controlled so that the fuel ignition timing is in the vicinity of compression top dead center (TDC) of the piston 4.

First, the target ignition timing and target pre-mixing period of the fuel are determined from a map or calculation formula on the basis of the engine rotational speed, degree of accelerator opening. As was described above, the target ignition timing is compression top dead center TDC. The target pre-mixing period varies according to parameters such as the engine rotational speed, degree of accelerator opening.

Then, a fuel injection starting timing, injection pressure and EGR rate which are such that the determined target injection timing and target pre-mixing period are satisfied are calculated on the basis of an ignition control model. Specifically, since the fuel pre-mixing period varies according to various conditions such as the engine cooling water temperature, intake air temperature, intake air pressure, an ignition control model is prepared beforehand for each engine using experimentation or physical formula. In the present embodiment, furthermore, since the fuel ignition timing is compression top dead center TDC, the fuel injection starting timing is a timing that is advanced from compression top dead center TDC by a time period equal to the target pre-mixing period and fuel injection period.

Next, the injector 9, regulator valve, EGR device 19 are controlled on the basis of the calculated fuel injection starting timing, injection pressure and EGR rate. Furthermore, the actual fuel injection completion timing is detected by the injection completion timing detection means, the actual fuel ignition timing is detected by the ignition timing detection means, and the actual pre-mixing period is calculated on the basis of these detection values.

Next, the difference between the actual pre-mixing period and the target pre-mixing period is calculated, this difference is added, and the control amounts of the pre-mixing period adjustment parameters (any one parameter selected from a set comprising the fuel injection starting timing, fuel injection pressure and EGR rate, or a combination of these parameters) in the next combustion cycle are determined. As a result, the actual pre-mixing period approaches the target pre-mixing period, so that the exhaust gas can be reliably and effectively improved.

Furthermore, it would also be possible to devise the system so that the pre-mixing period adjustment parameters (fuel injection starting timing, fuel injection pressure, EGR rate) are first determined from a map on the basis of the engine operating conditions, and the respective pre-mixing period adjustment parameters are corrected (feedback-controlled) in cases where the actual pre-mixing period and target pre-mixing period deviate from each other.

Thus, in the fuel injection control device of the present embodiment, the fuel pre-mixing period can be appropriately controlled; accordingly, the exhaust gas can be effectively and reliable controlled, and there is no aggravation of HC(Hydrocarbon) emission or fuel consumption.

Figure 2:
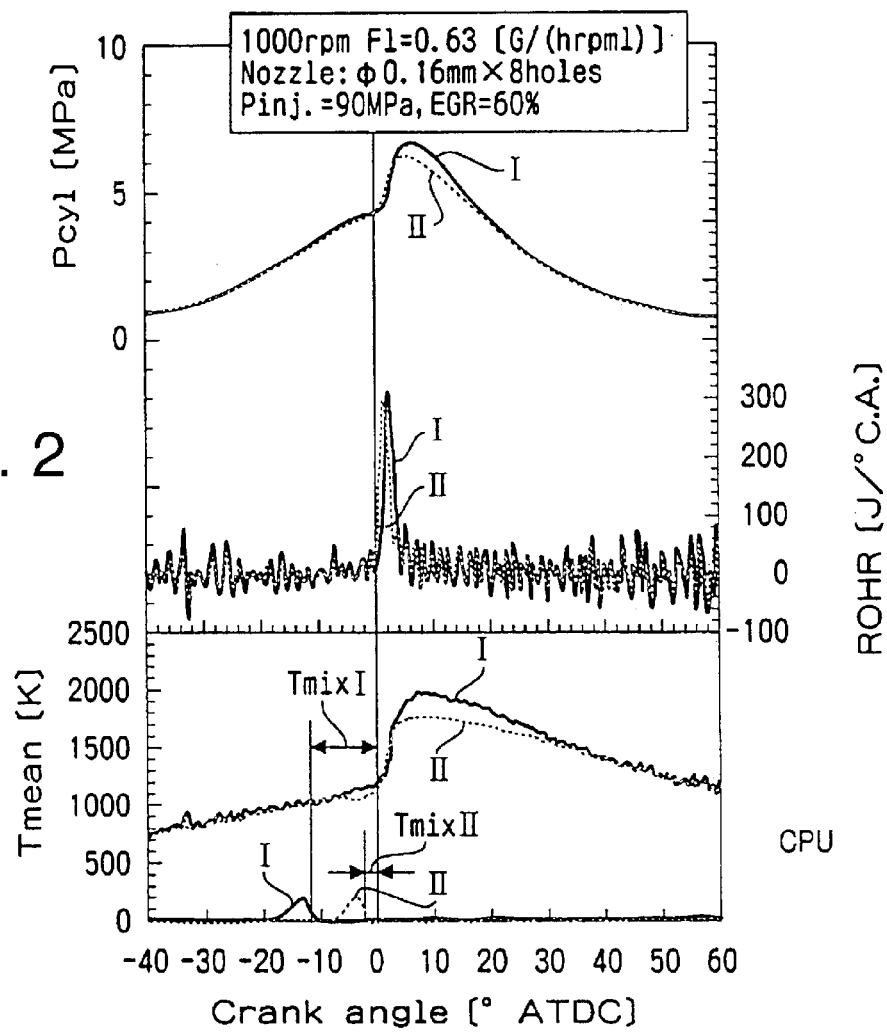
FIG. 2 is a graph showing the measurement results for average gas temperature in the cylinder, heat generation rate and cylinder internal pressure measured in cases where two types of combustion with different pre-mixing periods were performed.
Figure 3:
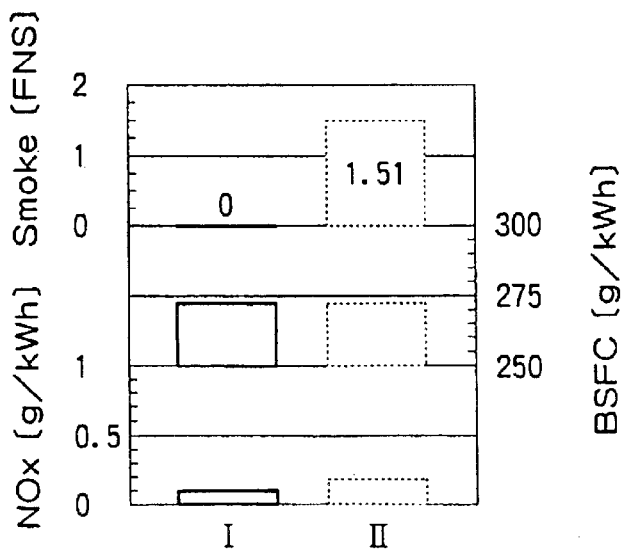
FIG. 3 is a graph showing the measurement results for amount of NOx emission, smoke concentration and fuel consumption rate measured in cases where two types of combustion with different pre-mixing periods were performed.

FIG. 2 shows measurement results for the mean gas temperature Tmean (K) inside the cylinder, the heat generation rate ROHR (J/°C.A.) and the cylinder pressure Pcyl (MPa) that were obtained when two types of combustion injection) with different fuel injection starting timings and pre-mixing periods were performed. Furthermore, FIG. 3 shows measurement results obtained for the NOx emission amount (g/kWh), smoke concentration (FSN) and fuel consumption rate BSFC (g/kWh) in this case.

In the figures, the line I shows the fuel injection starting timing set at approximately 16° BTDC (Before Top Dead Center)(−16° ATDC (After Top Dead Center)). The line II shows the fuel injection starting timing set at approximately 6° BTDC (−6° ATDC). Both in the case of line I and in the case of line II, control is performed so that the fuel is ignited immediately after compression top dead center TDC.

Specifically, in the case of line I, the pre-mixing period TmixI is adjusted to a relatively long value (approximately 13° in terms of crank angle), while in the case of line II, the pre-mixing period TmixII is adjusted to a relatively short value (approximately 3° in terms of crank angle).

As is seen from FIG. 2, the mean gas temperature Tmean inside the cylinder and the cylinder pressure Pcyl are slightly higher in the case of line I, where the pre-mixing period is long, than in the case of line II, where the pre-mixing period is short. On the other hand, the heat generation rate ROHR (Rate of Heat Release) is substantially the same for both lines I and II.

Furthermore, as is seen from FIG. 3, the NOx emission amount and smoke concentration are reduced in the case of line I, where pre-mixing period is long, compared to line II, where the pre-mixing period is short. Especially in regard to smoke, II showed a value of 1.51 (FSN), while absolutely no smoke was discharged in the case of I. It is seen from these results that even in the case of comparable heat generation rates, the smoke and NOx emission amounts differ greatly if the pre-mixing period is different. In other words, it is seen that if fuel injection is controlled on the basis of the heat generation rate alone, it is difficult to achieve effective cleaning of the exhaust gas, so that it is necessary to appropriately control the pre-mixing period.

Furthermore, in regard to the fuel consumption rate BSFC (Brake Specific Fuel consumption), more or less comparable values are obtained in I and II. This is thought to be due to the fact that the ignition timing is substantially the same in both cases. In other words, the fuel ignition timing has a great effect on the fuel consumption rate.

Figure 4:
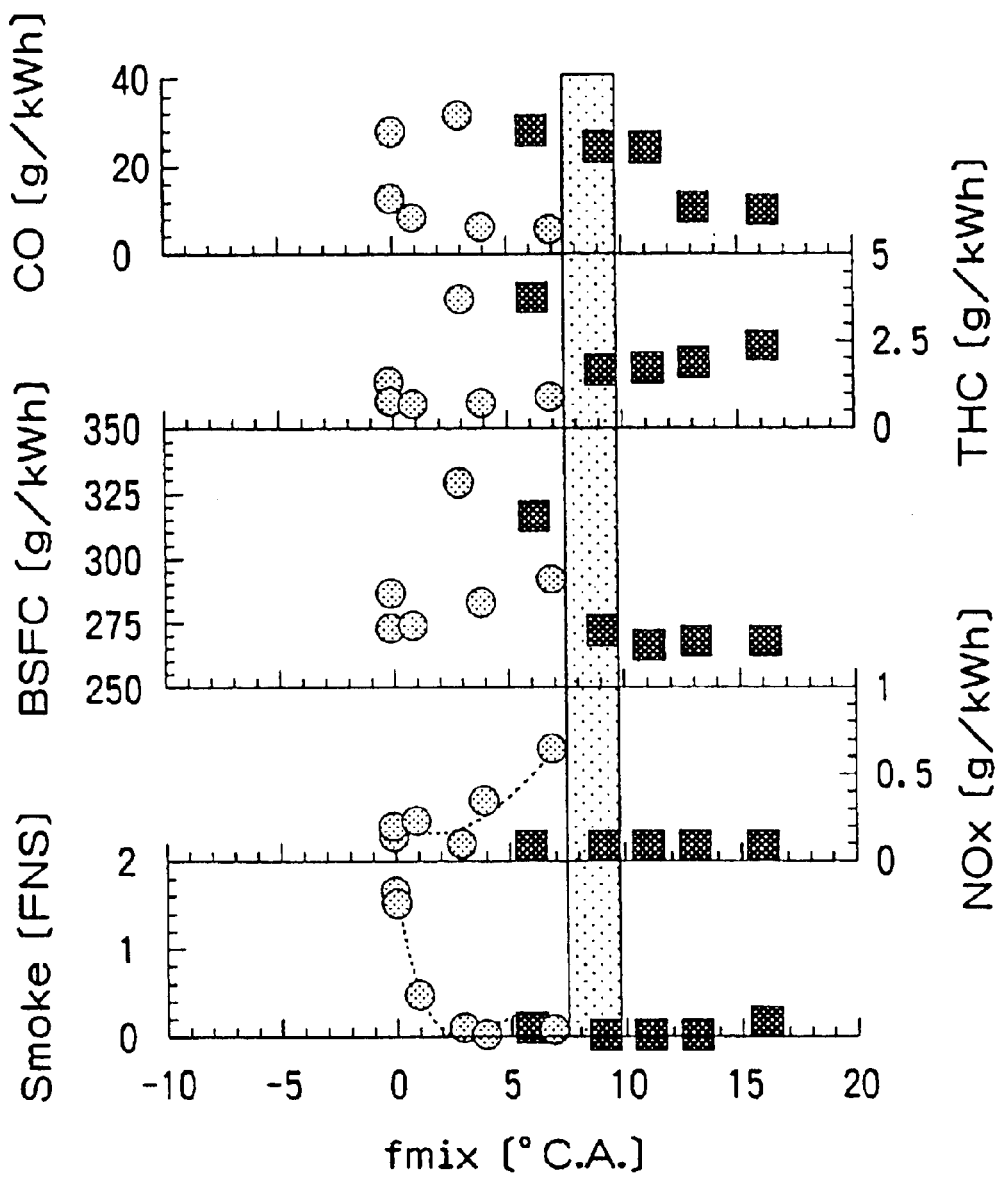
FIG. 4 is a graph showing the measurement results for smoke concentration, amount of NOx (Nitrogen Oxide) emission, amount of THC (Total hydrocarbon) emission, amount of CO (Carbon monoxide) emission and fuel consumption rate measured in a case where combustion was performed with the pre-mixing period varied.

Next, FIG. 4 shows measurement results obtained for the smoke concentration (FSN (Filter Smoke Number)), NOx (Nitrogen Oxide) emission amount (g/kWh), THC (Total HydroCarbon) emission amount (g/kWh), CO (Carbon Monoxide) emission amount (g/kWh) and fuel consumption rate BSFC (g/kWh) in a case where combustion (injection) was performed with the pre-mixing period varied. The horizontal axis in the figure indicates the pre-mixing period expressed in terms of the crank angle, and the figure shows measurement results that were obtained when the pre-mixing period was varied within the range of 0° CA to 16° CA (crank angle). Furthermore, the fuel ignition timing was fixed at compression top dead center TDC.

As is seen from this figure, the smoke concentration and NOx emission amount drop as the pre-mixing period becomes longer. Specifically, the smoke concentration reaches substantially the zero level when the pre-mixing period is approximately 5° CA (crank angle) or greater, and the NOx emission amount shows substantially a minimum value when the pre-mixing period is approximately 7° CA or greater. This means that the fuel is sufficiently rarefied during the pre-mixing period. Thus, if attention is paid only to smoke and NOx, it is desirable to set the pre-mixing period at approximately 7° CA or greater.

However, as is seen from the figure, the amount of THC (Total HydroCarbon) emission increases if the pre-mixing period is made excessively long. The reason for this is as follows: namely, in order to lengthen the pre-mixing period, it is necessary to set the fuel ignition starting timing at an earlier timing; however, if the fuel ignition starting timing is set at an excessively early timing, fuel is injected in a state in which the piston 4 is positioned in a considerably low position, so that the injected fuel does not enter the cavity 11, but instead adheres to the cylinder walls, and is discharged as unburned fuel. Especially from the standpoints of fuel consumption and output, the fuel ignition timing must be set in the vicinity of TDC (e. g., at 0 to 5° ATDC (after top dead center)); accordingly, the fuel injection starting timing must unavoidably be set at an early timing in order to lengthen the pre-mixing period. Consequently, in order to avoid an increase in the amount of THC emission, it is necessary to set the limit of the fuel injection starting timing at a timing which is such that the fuel injected from the injector 9 just enters the cavity 11.

It is seen from the above that it is necessary to set the pre-mixing period within a specified range in order to reduce NOx and smoke and avoid an aggravation of HC emission and fuel consumption. In the example shown in FIG. 4, this range is approximately 7° to approximately 10° CA. Accordingly, it is desirable that the abovementioned target pre-mixing period be set within this range. Furthermore, the optimal range of the pre-mixing period varies according to the engine operating conditions.

The present invention is not limited to the embodiment described above; various modifications are conceivable.

For example, the injection completion timing detection means that constitute the actual pre-mixing period detection means may also use a lift sensor that directly detects the movement (lift) of the needle valve of the injector 9. Furthermore, the common rail pressure sensor 17 that detects the pressure in the common rail 24 may also be used. Specifically, the common rail pressure temporarily decreases as a result of fuel injection, and this common rail pressure again rises when injection is completed; accordingly, the fuel injection completion timing can be judged on the basis of the detection value of the common rail pressure sensor 17.

Furthermore, a sensor which is installed facing the interior of the combustion chamber 10, and which detects the ion current that flows in the ions generated by ignition and combustion, may also be used as the ignition timing detection means. Concrete examples of ion sensors include the sensor described in Japanese Patent Application Laid-Open No. 11-82121. Alternatively, an acceleration sensor installed in the engine main body can also be used as the ignition timing detection means. Specifically, the system may be devised so that the vibration of the engine generated as a result of ignition and combustion is detected by such an acceleration sensor, and the fuel ignition timing is judged [on the basis of this vibration].

Furthermore, the pre-mixing period adjustment means are not limited to the EGR device indicated in the embodiment; this may also be a so-called internal EGR device which accumulates exhaust gas in the cylinder by opening the exhaust valve during the intake stroke or the like without using an EGR pipe 20, and various types of EGR devices using burned gases may be employed. Furthermore, various types of devices other than EGR devices may also be used as the pre-mixing period adjustment means.

For example, a variable compression ratio mechanism which varies the compression ratio by altering the volume of the combustion chamber, or a variable valve timing mechanism which varies the compression ratio by varying the opening-and-closing timing of the intake and exhaust valves, may also be used as the pre-mixing period adjustment means. In concrete terms, the pre-mixing period can be lengthened by lowering the compression ratio, or can conversely be shortened by increasing the compression ratio. Concrete examples of variable compression ratio mechanisms include the mechanism described in Japanese Patent Application Laid-Open No. 2001-20784, and concrete examples of variable valve timing mechanisms include the mechanism described in Japanese Patent Application Laid-Open No. 2000-130200.

Furthermore, injection means that lengthen the pre-mixing period by injecting a liquid such as water, alcohol or the like into the mixture inside the combustion chamber 10 so that the temperature of the mixture is lowered can also be used as the pre-mixing period adjustment means.

Furthermore, a spark plug which is installed facing the interior of the combustion chamber, and which ignites the mixture at a specified timing, can also be used as the pre-mixing period adjustment means.

Furthermore, an intake throttle valve 23 that varies the intake air pressure can also be used as the pre-mixing period adjustment means.

Furthermore, the pre-mixing period adjustment means may use a combination of the respective means described above.

What is claimed is:

1. A fuel injection control device of a diesel engine in which fuel injected into a combustion chamber is ignited after a pre-mixing period has elapsed following a completion of an injection of the fuel, comprising:

target pre-mixing period determining means for determining a target pre-mixing period on the basis of engine operating conditions;

actual pre-mixing period detection means for detecting an actual pre-mixing period; and pre-mixing period adjustment means for adjusting a pre-mixing period of the fuel so that the actual pre-mixing period approaches the target pre-mixing period.

2. The fuel injection control device of a diesel engine according to claim 1, wherein the actual pre-mixing period detection means comprise injection completion timing detection means for detecting a completion timing of an injection of the fuel, and ignition timing detection means for detecting an ignition timing of the fuel.

3. The fuel injection control device of a diesel engine according to claim 2, wherein the ignition timing detection means comprise any one or a combination of a cylinder internal pressure sensor which detects a pressure inside the combustion chamber, an ion sensor disposed inside the combustion chamber, and an acceleration sensor which detects an acceleration of an internal combustion engine.

4. The fuel injection control device of a diesel engine according to claim 1, wherein the pre-mixing period adjustment means control the injection timing and/or injection pressure of the fuel.

5. The fuel injection control device of a diesel engine according to claim 1, wherein the pre-mixing period adjustment means comprise any one or a combination of exhaust gas recirculating means for recirculating exhaust gas into the combustion chamber, a variable compression ratio mechanism for varying a compression ratio by altering a volume of a combustion chamber, a variable valve timing mechanism for varying the compression ratio by varying an opening-and-dosing timing of intake and exhaust valves, and injection means for injecting a liquid such as water, alcohol or the like into the combustion chamber.

6. The fuel injection control devices of a diesel engine according to claim 1, wherein the injection timing of the fuel is determined on the basis of the target pre-mixing period determined by the target pre-mixing period determining means, and the target ignition timing.

7. The fuel injection control device of a diesel engine according to claim 6, wherein the target ignition timing is in the vicinity of compression top dead center of the piston.

8. A fuel injection control method for a diesel method in which fuel injected into the combustion chamber is ignited after a pre-mixing period has elapsed following a completion of a fuel injection, comprising the steps of:

determining a target pre-mixing period on the basis of engine operating conditions;

detecting an actual pre-mixing period; and adjusting the pre-mixing period so that the actual pre-mixing period coincides with the target pre-mixing period.

9. The fuel injection control method for a diesel method according to claim 8, wherein the step of adjusting the pre-mixing period includes a step of adjusting the injection timing and/or injection pressure of the fuel.

10. The fuel injection control method for a diesel method according to claim 8, wherein the step of adjusting the pre-mixing period includes one or a combination of the steps of adjusting EGR, adjusting a compression ratio, and adjusting a temperature of a mixture.

* * * * *